(12) United States Patent
Bendiksen et al.

(10) Patent No.: US 7,364,638 B2
(45) Date of Patent: Apr. 29, 2008

(54) PROCESS FOR THE HOT DISPERSING OF A PAPER FIBER STOCK

(75) Inventors: Pal B. Bendiksen, Tranby (NO); Axel Gommel, Ravensburg (DE); Volker Niggl, Weingarten (DE)

(73) Assignee: Voith Paper Patent GmbH, Heidenheim (DE)

( * ) Notice: Subject to any disclaimer, the term of this patent is extended or adjusted under 35 U.S.C. 154(b) by 80 days.

(21) Appl. No.: 10/427,972

(22) Filed: May 2, 2003

(65) Prior Publication Data

US 2006/0102301 A1    May 18, 2006

(30) Foreign Application Priority Data

May 3, 2002    (DE) ................. 102 19 844

(51) Int. Cl.
    *D21C 9/08* (2006.01)
(52) U.S. Cl. ............................ 162/55; 162/57; 241/16; 241/17; 221/1
(58) Field of Classification Search .................... 162/6, 162/4, 5, 55, 57, 198, 254, 100; 241/18, 241/17, 15; 221/1
    See application file for complete search history.

(56) References Cited

U.S. PATENT DOCUMENTS 5,958,179 A * 9/1999 Gehr et al. .................... 162/6

6,250,573 B1 * 6/2001 Kriebel et al. ................ 241/17

FOREIGN PATENT DOCUMENTS

| DE | 3728890 | 7/1988 |
|---|---|---|
| DE | 19712653 | 10/1998 |

* cited by examiner

*Primary Examiner*—Mark Halpern
(74) *Attorney, Agent, or Firm*—Greenblum & Bernstein, P.L.C.

(57) ABSTRACT

The present invention is directed to a process for the hot dispersing of a paper fiber stock that includes providing an aqueous paper fiber stock and pressing the aqueous fiber stock in a thickening device. In this manner, water is at least partially removed from the aqueous fiber stock to form a highly consistent paper fiber stock. The process further includes heating the highly consistent paper fiber stock, dispersing the heated highly consistent paper fiber stock with a disperser, determining a thermal energy consumed to heat the highly consistent paper fiber stock, and controlling a dewatering effect of the thickening device. The dewatering effect is increased with rising thermal energy consumption and is reduced with a falling thermal energy consumption. The instant abstract is neither intended to define the invention disclosed in this specification nor intended to limit the scope of the invention in any way.

17 Claims, 3 Drawing Sheets

PROCESS FOR THE HOT DISPERSING OF A PAPER FIBER STOCK

CROSS-REFERENCE TO RELATED APPLICATIONS

The present application claims priority under 35 U.S.C. §119 of German Patent Application No. 102 19 844.6, filed on May 3, 2002, the disclosure of which is expressly incorporated by reference herein in its entirety.

BACKGROUND OF THE INVENTION

1. Field of the Invention

The present invention relates to a process and apparatus for the hot dispersing of paper fiber stock, which includes providing an aqueous paper fiber stock, pressing out part of the water in a thickening device to form a highly consistent paper fiber stock, heating the highly consistent paper fiber stock, and dispersing the heated highly consistent paper fiber stock with a disperser.

2. Discussion of Background Information

Processes of the above-mentioned type are used, e.g., to improve the quality of fiber stock that is obtained from recovered paper. It is known that paper fiber stock can be homogenized and thus substantially improved by dispersion. To that end, a highly consistent fiber stock is produced, which has a dry matter content of between 15 and 35%. Dispersers that are used for such processes are mostly very compact and have an excellent dispersing effect with high energy density. However, they require an even stock stream.

By thickening to 15 to 35%, a considerable part of the water previously present in the fiber stock is pressed out, whereby its viscosity during the dispersion substantially increases, and, if necessary, less water has to be heated with it. A particularly cost-effective machine for thickening is the screw extruder. With a screw extruder the fiber stock suspension is pressed out between a screw conveyor and a perforated jacket surrounding it, whereby the water escapes through the holes in the jacket. The highly consistent fiber stock thus obtained is pressed out of the screw.

The hot dispersing is carried out at a temperature that is far above the ambient temperature. Heating the fiber stock is usually carried out by the direct addition of steam, for which, e.g., a heating screw is suitable: a screw conveyor rotates in a horizontal housing, which screw conveyor loosens the fiber stock and brings it into contact with steam that is blown in. The stock heats up through condensation. For economic reasons this heating is carried out on the already thickened stock.

Modern installations for carrying out such a process should work automatically. They therefore feature one or more automatic control loops in order to render possible a sufficiently constant operation without constant human intervention. Particularly when recovered paper is used as raw material for producing the paper fiber stock, it is inevitable that the raw material properties change, in particular the composition of the fibers contained in the paper fiber stock and the amount of the non-fiber components. The aim should therefore be to design the regulation of an installation used for dispersing so that, despite the fluctuations mentioned, a paper fiber stock processed as evenly as possible can be supplied for further use.

A dispersing process is known from DE 37 28 890 with which the specific work of the disperser is regulated in that more or less dilution water is added before the dispersion as required. The process is effective, but not always sufficient and requires an increased thickening effort.

SUMMARY OF THE INVENTION

The present invention provides a process with which the dispersion installation can be regulated by simple, reliable means.

In particular, the present invention provides that the thermal energy consumed to heat the highly consistent paper fiber stock is determined and that the dewatering effect of the thickening device is controlled such that it is increased with higher consumption of thermal energy and reduced with falling consumption.

It is often impossible to thicken to a starting material consistency that is constant in time even with thickening devices operated with a constant feed amount and with operating parameters otherwise kept constant. Instead, there is always the danger that the highly consistent fiber stock that leaves the thickening device has such fluctuations in its consistency that the following dispersion becomes uneven and further process steps are also impaired because of this uneven consistency. With the aid of the new process, a simple and effective control strategy can now be designed for a dispersion installation that is used for dispersing paper fiber stocks. The fact is thereby used that the thermal energy consumed to heat the highly consistent fiber stock allows conclusions to be drawn about its composition, in particular its consistency.

The specific amount of heat (i.e., relative to the amount of solid matter) required for heating the thickened stock depends very largely on its water content. If the consistency of the fiber stock declines, more thermal energy has to be used to heat it to the same temperature difference: with steam feed, the steam consumption rises. Another possibility is the change of the temperature difference achieved by the heating. That means that, e.g., when the consistency declines, the original final temperature is no longer reached. These undesirable consequences can be eliminated by the process according to the invention, which ensures with simple elements a constant consistency of the fiber stock to be heated and subsequently to be dispersed.

The present invention is directed to a process for the hot dispersing of a paper fiber stock that includes providing an aqueous paper fiber stock and pressing the aqueous fiber stock in a thickening device. In this manner, water is at least partially removed from the aqueous fiber stock to form a highly consistent paper fiber stock. The process further includes heating the highly consistent paper fiber stock, dispersing the heated highly consistent paper fiber stock with a disperser, determining a thermal energy consumed to heat the highly consistent paper fiber stock, and controlling a dewatering effect of the thickening device. The dewatering effect is increased with rising thermal energy consumption and is reduced with a falling thermal energy consumption.

According to a feature of the invention, the determining of thermal energy consumed can include measuring temperatures of the highly consistent paper fiber stock before and after the heating of the highly consistent stock, and comparing a temperature difference between the measured temperatures to a preset desired value. If the temperature difference deviates from the preset desired value, the dewatering effect of the thickening device is changed.

In accordance with another feature of the invention, the heating of the highly consistent paper fiber stock can occur in a heating device located upstream of the disperser. The heating device may be a heating screw with direct steam feed.

The disperser may include at least two disperser fittings which respectively include a plurality of ring-shaped concentric rows of teeth, and the two disperser fittings are arranged so that the concentric teeth interlock without touching. Further, the dispersing of the highly consistent paper fiber stock can include moving the teeth in a circumferential direction relative to one another. Moreover, the dispersing of the highly consistent paper fiber stock can further include adjusting an axial distance between the two disperser fittings, whereby a dispersing effect is changed. A positioning path for axially adjusting the two disperser fittings can be limited to such an extent that the fiber technology result of the dispersing of the highly consistent paper fiber stock either does not change or changes only within a permissible range. Still further, the controlling of dewatering effect in the thickening device may have priority over the adjusting of the axial distance between the two disperser fittings. Also, the controlling of the dewatering effect in the thickening device and the adjusting of the axial distance between the two disperser fittings can be coordinated such that brief fluctuations are stabilized through the axial distance adjustment and lengthy fluctuations are stabilized through controlling the dewatering effect in the thickening device. The controlling of the dewatering effect in the thickening device and the adjusting of the axial distance between the two disperser fittings can also be coordinated such that an optimal operating result of the dispersing is achieved. The heating of the highly consistent paper fiber stock can include adding steam between the two disperser fittings. Further still, the determining of the thermal energy consumed may include measuring the steam consumed for the heating of the highly consistent paper fiber stock. A signal related to the measured steam can be utilized for the controlling of the dewatering effect in the thickening device. The determining of the thermal energy consumed can include measuring a temperature of the paper fiber stock between the two disperser fittings. A signal related to the measured temperature can be utilized for the controlling of the dewatering effect in the thickening device.

According to another feature of the present invention, the thickening device may include a screw extruder with a press screw, and the controlling of the dewatering effect in the thickening device can include changing a starting moment of the press screw.

Further, the thickening device can include a screw extruder, and the dewatering effect may be controlled by changing a counter-pressure of a press cake.

In accordance with a further feature of the instant invention, the thickening device may include a screen belt press with at least one press roll, and the dewatering effect may be controlled by changing a contact pressure of the screen belt press.

According to the invention, a drive capacity of the disperser can be adjusted to produce a specific dispersing work between 30 kWh/to and 150 kWh/to.

The present invention is directed to an apparatus for the hot dispersing of a paper fiber stock. The apparatus includes a thickening device structured and arranged for pressing an aqueous fiber stock, such that water is at least partially removed from the aqueous fiber stock to form a highly consistent paper fiber stock, a heating device arranged to heat the highly consistent paper fiber stock, and a disperser structured and arranged to disperse the heated highly consistent paper fiber stock with a disperser. The apparatus also includes a device for determining thermal energy consumed in heating the highly consistent paper fiber stock, and controlling unit structured to control a dewatering effect of the thickening device. With rising thermal energy consumption, the dewatering effect is increased, and, with falling thermal energy consumption, the dewatering effect is reduced.

In accordance with a feature of the present invention, the device for determining thermal energy consumed may include a temperature detector located at an inlet to said thickening device and a temperature detector located at an outlet of said thickening device.

According to another feature of the instant invention, the disperser can include at least two disperser fittings which respectively include a plurality of ring-shaped concentric rows of teeth, and the two disperser fittings can be arranged so that the concentric teeth interlock without touching. The at least two disperser fittings may be arranged to rotate relative to each other. The disperser can further include a device to adjust an axial distance between the two disperser fittings, and a positioning path for axially adjusting the two disperser fittings that is limited to such an extent that the fiber technology result of the dispersing of the highly consistent paper fiber stock either does not change or changes only within a permissible range. The heating device can be arranged to add steam between the two disperser fittings. The device for determining thermal energy consumed may include a device for measuring the steam consumed for the heating of the highly consistent paper fiber stock. The device for determining thermal energy consumed can be coupled to the control unit. Further, the device for determining thermal energy consumed can include a device for measuring temperature of the paper fiber stock between the two disperser fittings. The device for determining thermal energy consumed can be coupled to the control unit.

According to still another feature of the invention, the thickening device can include a screw extruder with a press screw. The control unit can control the dewatering effect by changing a starting moment of the press screw.

Further, the thickening device may include a screw extruder. The control unit may control the dewatering effect by changing a counter-pressure of a press cake.

In accordance with yet another feature of the present invention, the thickening device can include a screen belt press with at least one press roll. The control unit may control the dewatering effect by changing a contact pressure of the screen belt press.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
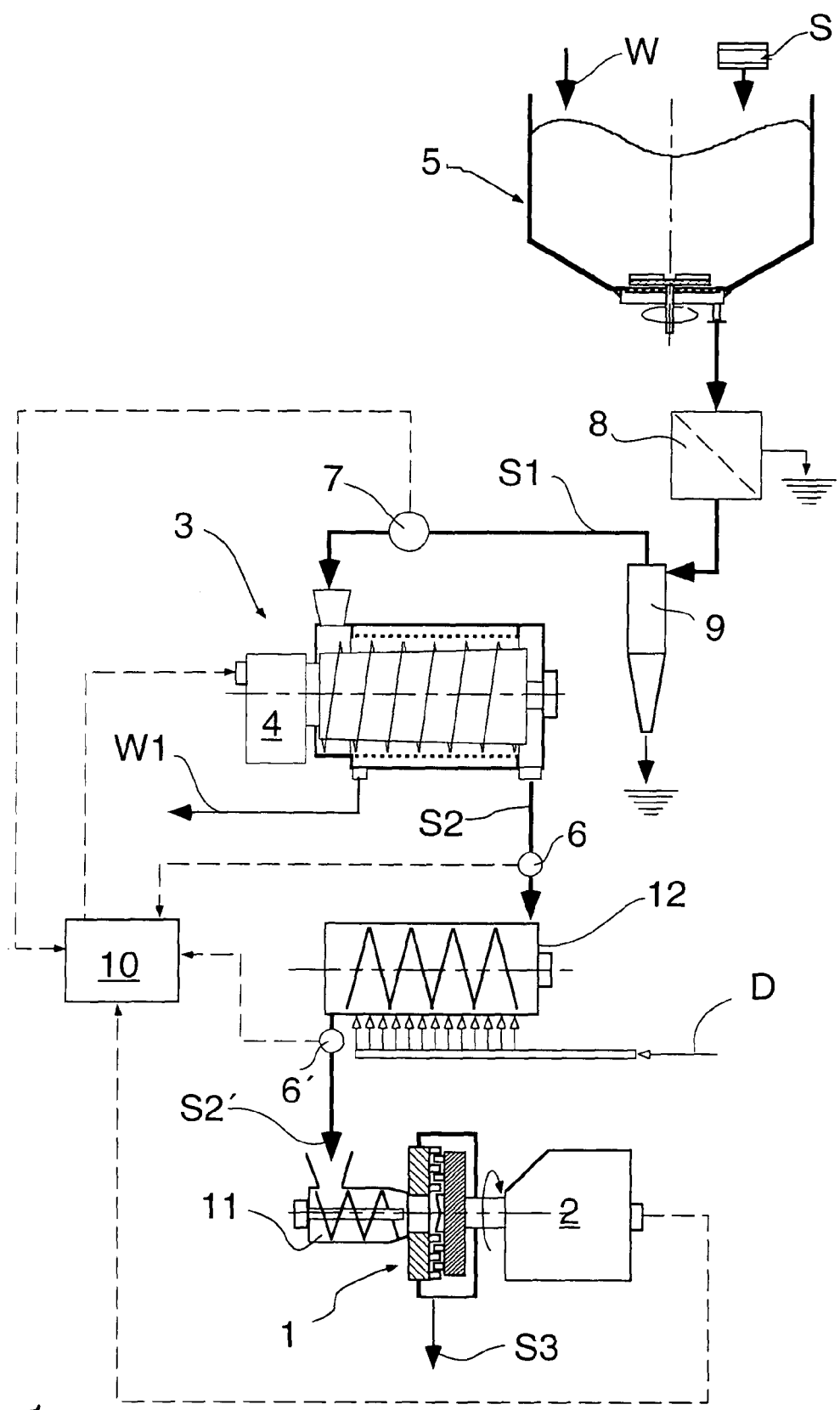
FIG. 1 diagrammatically illustrates an installation for carrying out the process according to the present invention.

In a simplified representation, FIG. 1 shows an exemplary embodiment with the most important equipment that can be used in carrying out the process according to the invention. The process starts from a raw material S that comprises, e.g., recovered paper, and is slushed together with water W in a pulper 5 with the aid of a driven rotor. The fibrous suspension thus produced passes through a wire in the base of pulper 5 and through a pressurized screen 8 and a high consistency cleaner 9, whereby coarse contaminants of the recovered paper are removed to form suspension S1. With pulpers of the type indicated here the suspension has a consistency, i.e., a solid matter content, between 3 and 6%. However, slushing procedures are also conceivable in which a solid matter content of over 12% is set. Via a thickening device 3, e.g., a screw extruder, that follows high consistency cleaner 9, a highly consistent paper fiber stock S2 is formed from suspension S1. Pressed out water W1 can be used again advantageously for slushing in pulper 5. Paper fiber stock S2 passes next into a heating device 12, e.g., a heating screw. The necessary steam D is blown into the interior of the heating screw through a number of openings. Due to the technical-physical conditions, a dwell time of several minutes has to be provided as a rule until the stock achieves the necessary temperature. Apart from the thus increased normal idle time, this procedure definitely has its advantages.

The hot, highly consistent paper fiber stock S2' is guided via a feed screw 11 centrally between two disperser fittings of a disperser 1 moved relative to one another. In this way, stock S2' is dispersed between the two disperser fittings and thereafter falls out of the housing of disperser 1 as homogenous fiber stock S3. The rotor of disperser 1 is driven by a disperser drive 2. The stock temperatures are measured at two measurement points 6 and 6', i.e., before and after heating device 12, and the measured temperatures are forwarded or signaled to a regulator 10. According to the invention, in the event of deviation from the preset desired values this can then influence thickening device 3. If a screw extruder is used for this, as shown in the exemplary illustration, there is the possibility of changing the starting moment of its drive 4 to adjust the consistency of highly consistent paper fiber stock S2, e.g., by varying the screw rotational speed. Further, a pick-up 7 can be arranged at the input to thickening device 3 to measure the amount of stock S1 added, and to forward the measured data, e.g., a measured value for the amount of stock S1 added, to regulating device 10. Usually the stock stream guided through this part of the installation is set to be constant. Moreover, the solid matter amount processed in disperser 1 can be determined by measuring the volume stream and the consistency. This in turn provides the possibility of adjusting the specific work in the disperser.

The specific work, usually given in units of kWh/t, is a central criterion for the dispersing effect. Dispersing should homogenize the fiber stock, but also has an effect in terms of fiber technology, i.e., the paper fibers themselves change. It is noted that these changes are often undesirable, and, therefore, should not exceed a certain level. They are substantially influenced by the distances at which the disperser work elements, e.g., the teeth of the disperser fittings, move past one another. A change in these distances therefore effects both the specific work and the fiber technology.

Figure 2:
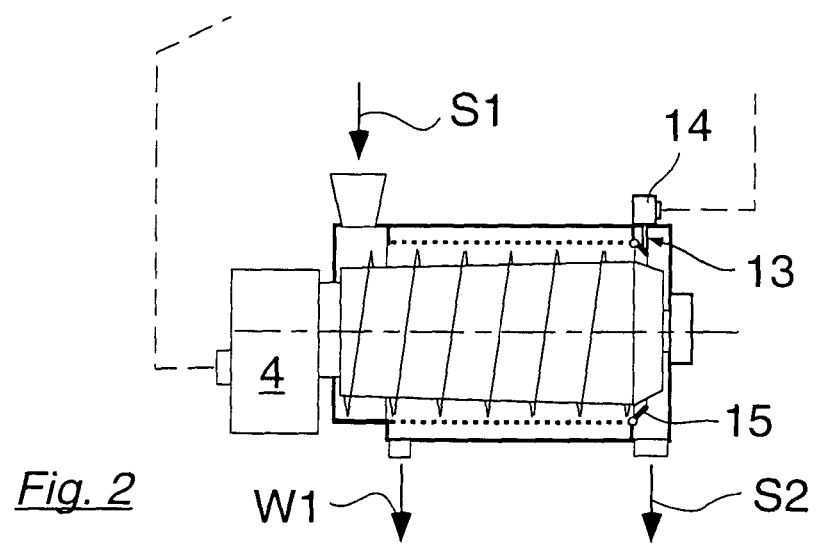
FIG. 2 illustrates a variant of the thickening device depicted in FIG. 1.

As is known, changing a screw rotational speed is not the only possibility of controlling the screw extruder used as thickening device 3. In addition, or alternatively, a counter pressure can be built up at the outlet of the screw extruder, i.e., where the highly consistent stock leaves the area of the screw. In this manner, one can regulate the dewatering capacity of the screw over a large range. A screw extruder that can be used in this way is diagrammatically shown in FIG. 2. Further, a counter-pressure device 13 is schematically suggested in this figure. The screw extruder can include, e.g., a number of pivoted flaps 15, and a control unit 14 provided for adjusting counter-pressure device 13 during operation. Of course, it is also conceivable that both possibilities of influencing the operation of such a screw extruder are usefully combined and integrated into the control concept.

Figure 3:
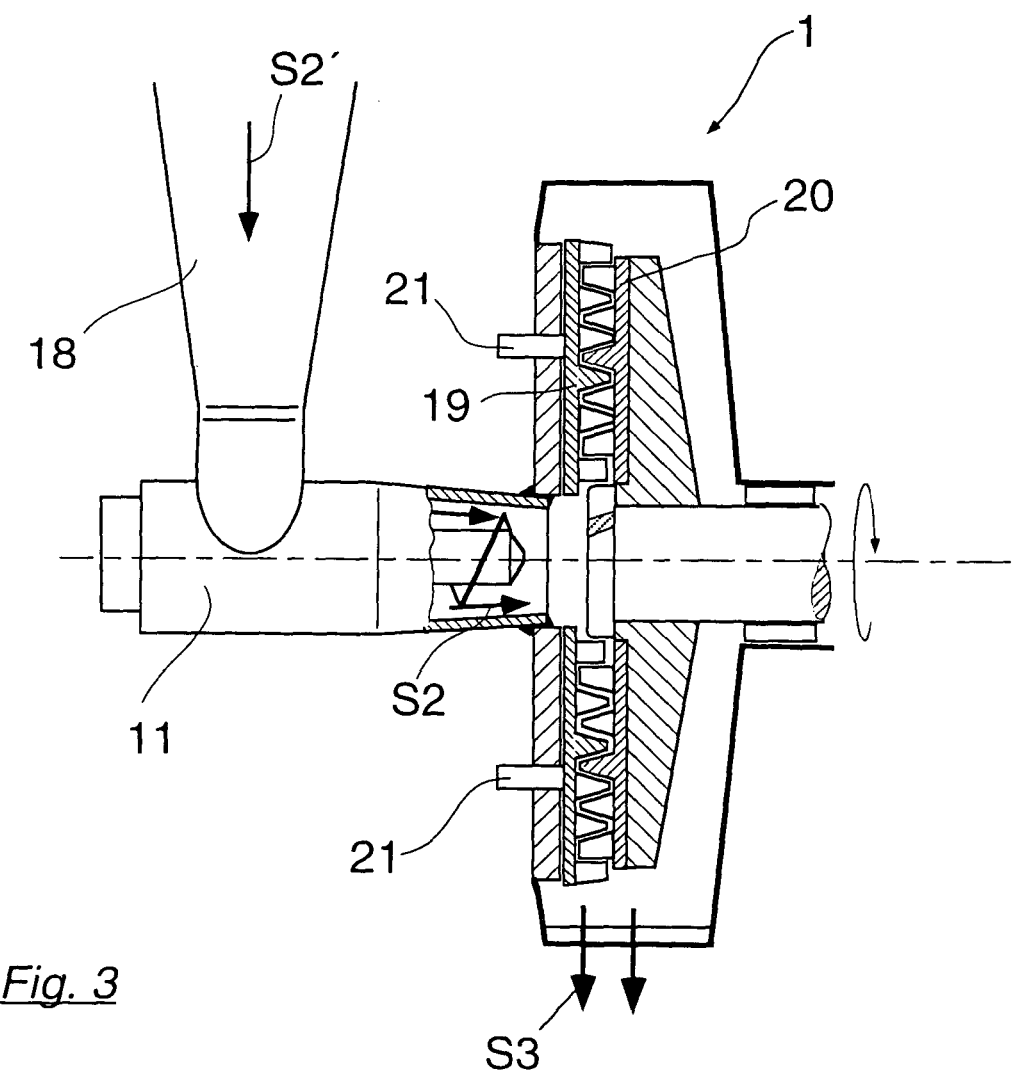
FIG. 3 illustrates a sectional view through a disperser suitable for the process.

A disperser that is particularly well suited for the process of the instant invention is shown in somewhat more detail in FIG. 3, without all constructive details being visible. The hot highly consistent paper fiber stock S2' passes through a pressure well 18 into feed screw 11. It can be seen somewhat more clearly here that disperser 1 features two disperser fittings 19 and 20, each of which contains several ring-shaped concentric rows of teeth that interlock without touching. Since disperser fitting 20 is connected to a driven rotor, its teeth can be moved in the circumferential direction relative to the stator fitting, i.e., disperser fitting 19, as a result of which the highly consistent paper fiber stock S2 is dispersed as stock S3.

The disperser shown here contains an adjusting device 21, with which the axial distance between disperser fittings 19 and 20 can be changed. However, this is only schematically suggested. Since the teeth of disperser fittings 19 and 20 have a conical form, the axial displacement means the distances between their flanks and those of the respective counter-fitting change with the already mentioned energy and technological effects. The new process can make this positioning possibility superfluous, which leads to savings. However, it is also conceivable to combine both influencing possibilities and to thus obtain a greater control potential. The possible positioning path could then be advantageously restricted such that the fiber technology effects, which are mostly undesirable, remain minimal. In other cases, in which a fiber technological effect is desirable, e.g., in order to influence the strength of the later produced paper, an additional degree of freedom in the control strategy of the entire disperser process results from the combination mentioned.

FIGS. 1 and 3 are based on devices in which the stock was heated in separate heating devices, e.g., heating screws. In such cases, the temperatures can be measured before and after heating. The temperature difference is then a gauge for the amount of heat consumed, whereby what is needed is not so much its exact absolute value, as the time change. If the temperatures are controlled, i.e., kept constant, the steam consumption changes and this in turn can be taken into consideration by the automatic control loop.

Figure 4:
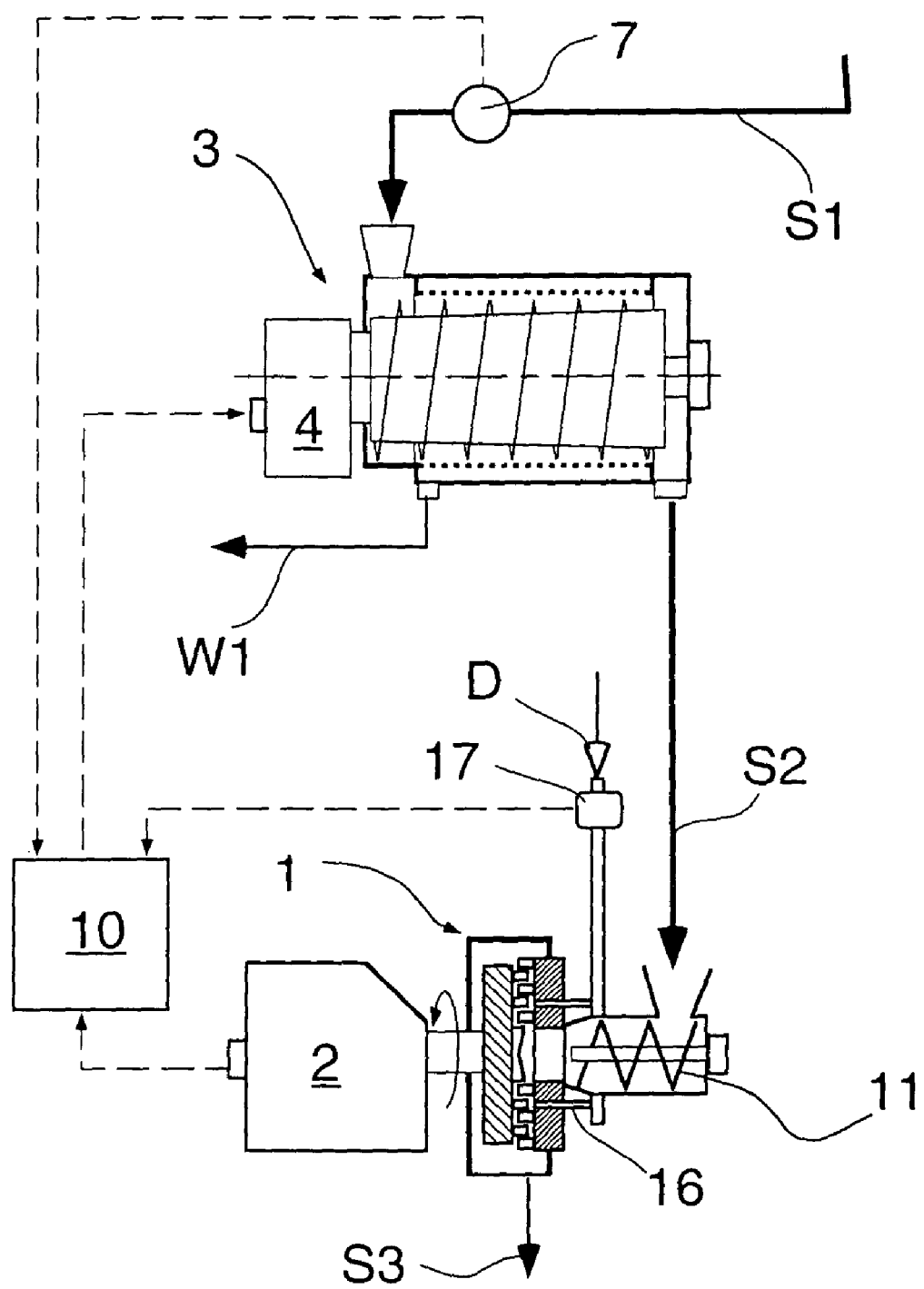
FIG. 4 illustrates a variant for heating the stock.

In the example shown in FIG. 4, stock S2 is heated such that steam D is fed directly into disperser 1 through a number of steam lines 16 that are only schematically suggested. This modern form of stock heating is described, e.g., in German Patent Application No. DE 197 12 653 A1, the disclosure of which is expressly incorporated by reference herein in its entirety. In addition to the drastically reduced equipment expense of the entire installation, it also has the advantage of short dwell times, which in turn improves the control of the entire installation. The amount of heat consumed can be determined in such embodiments, e.g., by measuring the steam consumption at a steam measurement point 17 or by measuring the stock temperature between the disperser fittings. Here, too, it is more a matter of the trends than the exact absolute values.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for the hot dispersing of a paper fiber stock comprising:
    providing an aqueous paper fiber stock;
    pressing the aqueous fiber stock in a thickening device, whereby water is at least partially removed from the aqueous fiber stock to form a highly consistent paper fiber stock;
    heating the highly consistent paper fiber stock;
    dispersing the heated highly consistent paper fiber stock with a disperser;
    determining a thermal energy consumed to heat the highly consistent paper fiber stock; and
    controlling a dewatering effect of the thickening device,
    wherein the dewatering effect is increased with rising thermal energy consumption and is reduced with a falling thermal energy consumption.

2. The process in accordance with claim 1, wherein the determining of thermal energy consumed comprises:
    measuring temperatures of the highly consistent paper fiber stock before and after the heating of the highly consistent stock; and
    comparing a temperature difference between the measured temperatures to a preset desired value,
    wherein, if the temperature difference deviates from the preset desired value, the dewatering effect of the thickening device is changed.

3. The process in accordance with claim 1, wherein heating of the highly consistent paper fiber stock occurs in a heating device located upstream of the disperser.

4. The process in accordance with claim 3, wherein the heating device is a heating screw with direct steam feed.

5. The process in accordance with claim 1, wherein the disperser comprises at least two disperser fittings which respectively include a plurality of ring-shaped concentric rows of teeth, and the two disperser fittings are arranged so that the concentric teeth interlock without touching, and the dispersing of the highly consistent paper fiber stock comprises moving the teeth in a circumferential direction relative to one another.

6. The process in accordance with claim 5, the dispersing of the highly consistent paper fiber stock further comprises adjusting an axial distance between the two disperser fittings, whereby a dispersing effect is changed,
    wherein a positioning path for axially adjusting the two disperser fittings is limited to such an extent that the fiber technology result of the dispersing of the highly consistent paper fiber stock either does not change or changes only within a permissible range.

7. The process in accordance with claim 6, wherein the controlling of dewatering effect in the thickening device has priority over the adjusting of the axial distance between the two disperser fittings.

8. The process in accordance with claim 6, wherein the controlling of the dewatering effect in the thickening device and the adjusting of the axial distance between the two disperser fittings are coordinated such that certain fluctuations are stabilized through the axial distance adjustment and other fluctuations longer in time than the certain fluctuations are stabilized through controlling the dewatering effect in the thickening device.

9. The process in accordance with claim 6, wherein the controlling of the dewatering effect in the thickening device and the adjusting of the axial distance between the two disperser fittings are coordinated such that an optimal operating result of the dispersing is achieved.

10. The process in accordance with claim 5, wherein the heating of the highly consistent paper fiber stock comprises adding steam between the two disperser fittings.

11. The process in accordance with claim 10, wherein the determining of the thermal energy consumed comprises measuring the steam consumed for the heating of the highly consistent paper fiber stock,
    wherein a signal related to the measured steam is utilized for the controlling of the dewatering effect in the thickening device.

12. The process in accordance with claim 10, wherein the determining of the thermal energy consumed comprises measuring a temperature of the paper fiber stock between the two disperser fittings,
    wherein a signal related to the measured temperature is utilized for the controlling of the dewatering effect in the thickening device.

13. The process in accordance with claim 1, wherein the thickening device comprises a screw extruder with a press screw, and the controlling of the dewatering effect in the thickening device comprises changing a starting moment of the press screw.

14. The process in accordance with claim 1, wherein the thickening device comprises a screw extruder,
    wherein the dewatering effect is controlled by changing a counter-pressure of a press cake.

15. The process in accordance with claim 1, wherein the thickening device comprises a screen belt press with at least one press roll,
    wherein the dewatering effect is controlled by changing a contact pressure of the screen belt press.

16. The process in accordance with claim 1, wherein a drive capacity of the disperser is adjusted to produce a specific dispersing work between 30 kWh/to and 150 kWh/to.

17. A process comprising:

pressing fibrous stock in a thickening device to thicken the fibrous stock according to a controllable dewatering effect;

heating the thickened stock;

determining a thermal energy consumed in heating the thickened fibrous stock; and controlling the controllable dewatering effect of the thickening device.

* * * * *